April 23, 1957 L. B. MACKE 2,789,492
HAND GUIDED, SELF-PROPELLED CULTIVATING DEVICE
Filed Jan. 3, 1955
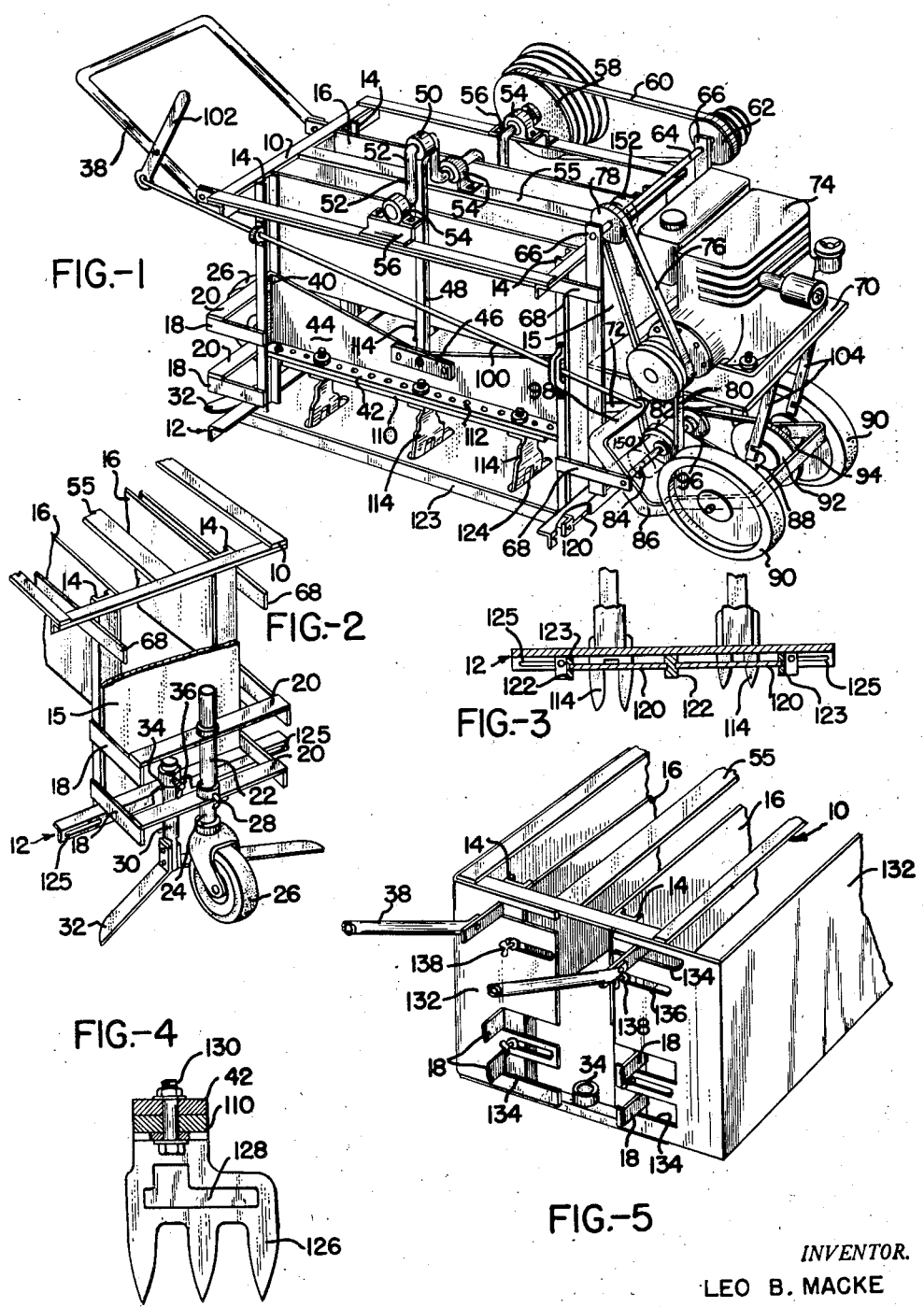
INVENTOR.
LEO B. MACKE
BY Toulmin & Toulmin
ATTORNEYS

United States Patent Office 2,789,492
Patented Apr. 23, 1957

2,789,492

HAND GUIDED, SELF-PROPELLED CULTIVATING DEVICE

Leo B. Macke, Dayton, Ohio

Application January 3, 1955, Serial No. 479,422

6 Claims. (Cl. 97—44)

This invention relates to a ground working implement, and particularly to a sod aerating and cultivating device.

In the cultivation of ground, particularly in gardens and truck patches, it is often desired to break up the ground and to destroy weeds in between crop rows without disturbing the crops. The usual device provided for this purpose is not as effective as is always desired, particularly with respect to disturbing of the crops.

Further, the usual cultivating arrangement is of such a nature that earth is apt to be thrown over into the crop row, possibly damaging delicate plants. Many times, with a conventional cultivating device, operation thereof is extremely difficult, particularly where the ground is hard or where a certain amount of moisture is present in a clay-like soil, due to the fact that the usual cultivator accomplishes its work by considerable movement of the earth by the cultivating elements thereof.

A particular work operation for which the device of the present invention is well adapted is that of aerating sod. This work operation is important in maintaining a strong growth of turf and preparing grassed areas for receiving water and fertilizers.

Having the foregoing in mind, it is an object of the present invention to provide a cultivator, and a method of cultivating, which avoids the drawbacks referred to above.

Another object of the present invention is the provision of a cultivating device which will cultivate soil without requiring a great deal of power for the operation of the cultivator.

A further object of the present invention is the provision of a cultivating device which will cultivate soil as closely to the crop row as is desired without in any way harming plants in the crop row.

A still further object of the present invention is the provision of a cultivator, and a method of operation thereof, which will prevent small roots leading from the plants in the crop row from being severed whereby a stronger crop growth will result.

Another particular object of the present invention is the provision of a cultivator of the general nature referred to which is adjustable to accommodate different crop spacings.

A still further object of the present invention is the provision of a cultivator which includes an arrangement for preventing the cultivating elements from becoming loaded with soil.

Another object of the present invention is the provision of a cultivating arrangement which is light and thus easily portable, but which is extremely strong whereby it is capable of hard usage.

Another particular object of this invention is the provision of a device adapted for aerating turf without in any way damaging the turf.

These and other objects and advantages of this invention will become more apparent upon reference to the following specification taken in connection with the accompanying drawings, in which:

Figure 1 is a perspective view showing a cultivator according to my invention;

Figure 2 is a fragmentary perspective view looking in from the rear of the cultivator showing a caster wheel arrangement therefor and weed cutting attachments;

Figure 3 is a transverse sectional view showing a detail of construction of the cultivator;

Figure 4 is a fragmentary view showing how additional cultivating elements could be attached to the cultivating device to increase the effective width thereof; and Figure 5 is a perspective view showing how side shields could be provided for the device, with the shields being adjustable laterally to provide shielding means for the device in both of its adjusted positions.

Referring to the drawings somewhat more in detail, it will be seen in Figures 1 and 2 that the cultivator according to the present invention comprises a framework which may be made up, for example, by the upper and lower rectangular sub-frames 10 and 12 consisting of strips, bars, angles, or channels arranged in overlapping relation and rigidly secured together at the corners as by bolts or welding.

Extending vertically between the sub-frames 10 and 12, at each end thereof, are the laterally spaced inwardly opening channel members 14 which are connected at their upper ends to the upper sub-frame 10 and at their lower ends to the lower sub-frame 12, as by bolting or welding.

For the purpose of bracing the described framework there is provided the sheet metal plates 16 extending the full length of the frame and part way down the channel members 14, having their opposite end edges extending along the insides of the channels 14 and fixedly secured thereto. This form of brace is light but extremely strong.

There are also preferably provided the end panels 15 extending between the channel members 14 at each end and fixed thereto which close the ends of the device and also provide bracing.

At the rear end of the cultivator, toward the bottom, there is fixed to the outside edges of the channel members 14, so as to extend rearwardly therefrom, the bars 18 which carry at their rear ends the transversely extending support bars 20 which are availed of for supporting a sleeve 22 that receives the upwardly projecting shaft 24 of a caster wheel 26. The shaft 24 may itself extend through bars 20 if so desired, with pivot means being provided at the lower end of the shaft so that caster wheel 26 can rotate about the axis of the shaft.

In either case it is preferable to provide for vertical adjustment of shaft 24, with means for locking the shaft in its adjusted positions also being provided as by means of thumb screw 28.

As will also be seen in Figure 2, the rear transverse bar of the lower sub-frame 12 is availed of for supporting a weed cutting device, consisting of a vertical bar 30, from the lower ends of which there extend laterally the weed cutting blades 32 which have their forward edges sharpened, and which are preferably parallel with the ground and angled rearwardly from supporting bar 30. For supporting the bar 30 sub-frame 12 may carry a collar or sleeve 34 with which is associated the clamping thumb screw 36.

The channel members 14 support the longitudinally extending members 68 which, at their rear ends, support the handle 38 in any suitable manner. The channel members 14, in addition to serving as structural members forming a part of the frame, also serve as guideways for receiving a pair of vertically reciprocable slides, with one of the slides being seen on the near side of Figure 1 wherein it will be observed to comprise shoe portions 40 riding in the channel members with, preferably, bronze slippers interposed between the shoes and the channel members.

Extending laterally between the shoes 40 is an apertured bar 42 and a vertical stiffening plate 44 connected between the shoes and the back of the bar, thus making an extremely rigid structure.

Intermediate the ends of stiffening plate 44 there is a block 46 pivotally receiving the lower end of connecting rod 48, which leads upwardly to have its upper end connected at 50 with crankshaft 52 which is journalled in the bearings 54. The two outermost bearings 54 are supported in the Z clips 56 attached to the outer bars of upper frame part 10, while the center one of bearings 54 is carried on a member 55, which may be a channel member, extending between the end members of the upper sub-frame 10.

One end of the crankshaft carries a pulley 58 that is driven by a belt 60. Belt 60 also passes about a drive pulley 62 mounted on a shaft 64 which is journalled in the upper ends of a pair of support bars 66 extending vertically along the front of the frame and being supported in spaced relation thereto on the outer ends of the forwardly projecting bars 68 which are fixed, as mentioned previously, to the outer faces of the channel members 14. About midway down the vertical bar 66 there is located therebetween the forwardly extending horizontal engine platform 70, the rear edge of which is connected with the vertical bars 66, as by welding or by suitable supporting bracket means, and the forward edge of which is supported as by means of the diagonal brace bars 72 leading downwardly and backwardly from the underneath side of the platform at points adjacent the lower ends of vertical bars 66.

Mounted on engine platform 70 is an engine 74 having driven pulley means, one of which is connected by a belt 76 with pulley 78 on shaft 64, and the other of which is connected by a belt 80 with a pulley 82 mounted on a shaft 84 extending transversely of the frame, and which may advantageously be journalled at its opposite ends in the forward portions of the lowermost pair of the bars 68.

Also journalled on the same axis as shaft 84 is a yoke having side members 86 which carry shaft 88 supporting a pair of wheels 90. A pulley 92 on the shaft is connected by a belt 94 with a pulley 96 fixed to shaft 84.

The shaft 88 is adapted for vertical adjusting movements relative to the frame by an extension 98 on one of the lever arms that is connected by a link 100 with a lever 102 carried on a handle 38. By adjustment of lever 102 the entire frame can be raised and lowered relative to shaft 88.

With the frame in its lowered position the transverse forward portion of the yoke is engaged by the lower ends of the elements 104 projecting downwardly from the entire platform 70 for supporting the engine load directly on the shaft 88 and wheels 90, whereby the device is convenient to manipulate while the frame is relieved of stresses.

When the frame is raised upwardly relative to the shaft the frame shifts forwardly so that the weight of the engine is disposed above shaft 88 and, preferably, somewhat forwardly thereof, thereby to make the entire unit easy to manipulate.

Returning now to the vertically reciprocating members within the frame of the device, each of these is adapted for receiving on the lower side of the apertured bar 42 forming a part thereof, a tool carrying bar 110, which may be detachably secured to bar 42 as by the bolts 112. Tool carrying bar 110 carries on its underneath side a plurality of tool elements 114 which may be, as illustrated, relatively thin flat sheet metal members having bifurcated pointed lower ends so that they are somewhat in the nature of a hoe.

The tool elements 114 may vary in size and number and are provided for the purpose of penetrating the ground being worked thereby to break up the soil and to aerate the soil, and to prepare the soil for absorbing water that falls thereon. This is accomplished according to the present invention by utilizing the vertically reciprocating hoe-like elements with a minimum of agitation of the ground and, therefore, with a minimum load being imposed on the driving engine. Since the cultivator remains in motion during the time the tool elements are in the ground it will be evident that it is preferable for the elements to be somewhat of a flexible nature, at least to have a resilient connection with the tool carrying bar 110. This can be accomplished by forming the tool elements, for example, of spring steel, or, if it is desired for the tool elements themselves to be heavier and of a more rigid nature, by providing a resilient connection between the tool elements and the tool bar 110.

The tool elements are illustrated as extending vertically downwardly, but it will be evident that the elements could be inclined slightly, preferably toward the back, and by virtue of the resilient nature of the tool elements, or connection thereof with the tool bar, the forward progress of the cultivator would not be impeded by the penetration of the soil by the tools. It will be evident that there could be as many, or as few, of the tool elements as desired; three being illustrated along the length of the tool bar, as an example.

Since these tool elements will have a tendency to have soil cling thereto, particularly in moist clay, it sometimes will be desirable to provide the apertured plates 120 slidably supported in the depending bracket means 122 at the center, and with the tool elements extending through the apertures 124 in the said plates. The outside edges of plates 120 are slidably supported in the side members 123 of the lower subframe which have adjustable connection with the end members of the subframe, as by means of the slots 125.

These plates will maintain the elements substantially free of soil and can slide endwise in the frame to follow movements of the tool elements as they flex during forward movement of the cultivator when the elements are in engagement with the ground.

To accommodate the cultivator for different widths, or to adapt it to general cultivation preliminary to planting, it may be desirable to add one or more rows of tool elements to one or both sides thereof. This can be accomplished, as illustrated in Figure 4, by providing additional tool elements 126 of the same general nature as referred to above, except that they are wider, having an additional tooth or hoe portion at the side.

These tool elements 126 are secured by bolts 130 to the vertically reciprocating slides in the same manner as the tool elements 114. Optionally, the tool bars 110 could be made up and the entire tool unit replaced as desired. The tool elements 126 in Figure 4 are preferably braced by a stiffening rod 128. In this manner the cultivator can be modified from a narrow gauge implement to one of substantial width. With the wide tools, the members 123 will be adjusted outwardly on the end members of subframe 12.

It may also be desired, particularly when the cultivator is to be used in connection with the cultivation of crops of substantial size, to shield the sides of the cultivator. This can be accomplished by utilizing formed sheet metal side shields as illustrated at 132 in Figure 5. These side shields extend along the length of the frame of the cultivator and have their ends turned inwardly; being provided with suitable slot means as at 134 to receive bars and other parts of the cultivator that project forwardly and rearwardly from the frame proper.

These side shield members are preferably laterally adjustable so that the sides of the cultivator can be shielded with both narrow and wide gage operations. This can be accomplished by providing slots in the ends of the side shields as at 136, through which extend the clamping thumb screws 138.

It will be apparent from the foregoing that I have invented a new and novel cultivating device operating on a substantially different principle from previous cultivating devices, and having the advantage of being light and inexpensive and easy to operate. The cultivator is readily adaptable between narrow and wide gauge operations by the addition of tool elements at the sides thereof, and furthermore, the tool elements themselves can readily be replaced should they become worn, bent, or otherwise defective in a simple manner merely by removing the entire tool bar and replacing it with another.

This also permits tools of different characters to be utilized with the device should it become necessary or desirable to change the type of tool being utilized on account of soil conditions, or on account of the end result to be obtained.

For example, in the treating of lawns or the like, it might be desirable to use single pointed tool elements to penetrate the sod and underlying earth in order to aerate the soil and prepare it for absorbing moisture. On the other hand, for cultivation of a planted garden plot or the like the tool elements illustrated would be preferable on account of the tendency thereof to break up and pulverize the soil without, at the same time, overly disturbing the soil. Still further, in breaking up new soil, or in preparing previously planted areas for new planting, it might be desirable to use relatively broad knife-like tool elements which would tend to chop up vegetation, and similar trash, on the ground so that the soil would be in good condition for subsequent working operations.

It will also be evident that the device could be used with, or without, the weed cutting elements illustrated in Figure 2, and that the cleaning plates 120 shown in Figure 3 could be employed only when necessary.

It will also be evident that it would be preferable to include clutch elements in the drive train, such as a clutch element at 150 associated with the drive train to the front wheels of the device, and a clutch element 152 associated with the drive train of the crankshaft of the device.

Handle-mounted controls for such clutch elements, according to known practices in the art, could be provided so that the operator could, at all times, control the forward motion of the cultivating device as well as the rotation of the crankshaft thereof.

While a certain relationship between motion rate of vertical reciprocation of the tool carrying slides would normally be provided for, it is possible that it might be desired to vary this relationship. For this purpose the pulley means, as at 58 and 62, could be of the multiple groove type, whereby the proper number of strokes of the tool carrying slides per unit of forward travel of the device could be had for different ground working operations.

It will be understood that this invention is susceptible to modification in order to adapt it to different usages and conditions and, accordingly, it is desired to comprehend such modifications within this invention as may fall within the scope of the appended claims.

I claim:

1. In a ground working device; a longitudinally extending frame including vertical channel means at each longitudinal end facing inwardly, tool holding slides extending longitudinally of the frame and engaging said channel means, a crankshaft extending transversely of the frame at the top having a throw over each slide connected to the slides so rotation of the crankshaft will move the slides vertically in the frame, a handle structure at one longitudinal end of the frame, forward, laterally spaced supporting wheels on the frame at the other longitudinal end, an engine platform on the frame above the wheels, and an engine on the platform having driving connections with said crankshaft and with said wheels, there being caster wheel means at the handle end of the frame, and said supporting wheels being vertically adjustable on the frame to raise and lower the frame relative to the ground being worked, the engine having driving connection with the wheels in the raised and lowered positions of the wheels.

2. In a ground working device; a longitudinally extending frame including vertical channel means at each longitudinal end facing inwardly, tool holding slides extending longitudinally of the frame and engaging said channel means, a crankshaft extending transversely of the frame at the top having a throw over each slide connected to the slides so rotation of the crankshaft will move the slides vertically in the frame, a handle structure at one longitudinal end of the frame, forward, laterally spaced supporting wheels on the frame at the other longitudinal end, an engine platform on the frame above the wheels, and an engine on the platform having driving connections with said crankshaft and with said wheels and adapted to drive said wheels continuously, each said slide comprising an apertured horizontal bar at the bottom and a tool bar detachably secured to the bottom side of the horizontal bar having tool elements spaced longitudinally thereon and dependent therefrom, each said tool element being a hoe-like member having a resilient connection with the tool bar.

3. In a ground working device; a longitudinally extending frame including vertical channel means at each longitudinal end facing inwardly, tool holding slides extending longitudinally of the frame and engaging said channel means, a crankshaft extending transversely of the frame at the top having a throw over each slide connected to the slides so rotation of the crankshaft will move the slides vertically in the frame, a handle structure at one longitudinal end of the frame, forward, laterally spaced supporting wheels on the frame at the other longitudinal end, an engine platform on the frame above the wheels, and an engine on the platform having driving connections with said crankshaft and with said wheels, the engine and connections being adapted to drive said wheels continuously, each said slide comprising an apertured horizontal bar at the bottom and a tool bar detachably secured to the bottom side of the horizontal bar having tool elements dependent therefrom, each said tool element being a hoe-like member having a resilient connection with the tool bar, said frame having slotted plate means therebeneath through which said tool elements extend so reciprocation of the tool elements will cause the plate means to strip soil therefrom, said plate means being supported on the frame for sliding, rockable movement longitudinally thereof and being fixed against vertical movement relative to the frame.

4. In a ground working device; a longitudinally extending frame including vertical channel means at each longitudinal end facing inwardly, tool holding slides extending longitudinally of the frame and engaging said channel means, a crankshaft extending transversely of the frame at the top having a throw over each slide connected to the slides so rotation of the crankshaft will move the slides vertically in the frame, a handle structure at one longitudinal end of the frame, forward, laterally spaced supporting wheels on the frame at the other longitudinal end, an engine platform on the frame above the wheels, and an engine on the platform having driving connections with said crankshaft and with said wheels, each said slide comprising an apertured horizontal bar at the bottom and a tool bar detachably secured to the bottom side of the horizontal bar having flexible tool elements dependent therefrom, each said tool element comprising a plurality of laterally spaced downwardly projecting point portions interconnected at their upper ends by a transversely extending portion, and there being a stiffening member attached to said transversely extending portion.

5. In a ground working device: a longitudinally extending frame, vertically adjustable wheel means supporting the frame rearwardly, laterally spaced ground wheels supporting the frame forwardly, the frame including a platform which projects forwardly of the main body of the frame and which extends substantially over the ground wheels, an engine supported on the platform, a vertically reciprocating slide carried by the body of the frame, said slide extending longitudinally of the frame, means including ground working tools carried by the slide, the tools being spaced longitudinally of the slide and frame and adapted to flex in a direction longitudinally of the frame, power transmission means connecting the engine with the slide for causing reciprocation of the slide, other power transmission means connecting the engine with the ground wheels for driving of the wheels to occasion forward movement of the device, and means for raising and lowering of the frame relatively to the wheels while the wheels are in driving relation with the engine, said means including means pivotally supporting the ground wheels with respect to the frame.

6. In a ground working device: a longitudinally extending frame, wheel means supporting the frame rearwardly, ground wheels supporting the frame forwardly, the main body of the frame being between the forward and rearward wheels, a vertically reciprocating slide carried by the main body of the frame, said slide extending longitudinally of the frame between the forward and rearward wheels, means including ground working tools carried by the slide and adapted to penetrate ground to work the same, the tools being spaced longitudinally of the slide and frame and adapted to flex in a direction longitudinally of the frame, and a cleaning plate carried by the frame above the lower extremities of the tools, the plate having slots through which the tools pass in reciprocation, the plate being engageable by the tools in their movement for removing material of the ground which has been worked from the tools, and means carried by the device for driving the slide in reciprocation and the wheels in rotation simultaneously.

References Cited in the file of this patent

UNITED STATES PATENTS

| | | |
|---|---|---|
| 1,327,424 | Dupler | Jan. 6, 1920 |
| 1,430,219 | Dominguez | Sept. 26, 1922 |
| 1,538,724 | Mills | May 19, 1925 |
| 1,853,079 | Plant | Apr. 12, 1932 |
| 2,193,575 | Thompson | Mar. 12, 1940 |
| 2,206,264 | Rose | July 2, 1940 |
| 2,228,723 | Large | Jan. 14, 1941 |
| 2,314,035 | Dontje | Mar. 16, 1943 |
| 2,364,043 | Ariens | Dec. 5, 1944 |
| 2,638,831 | Ferguson et al. | May 19, 1953 |
| 2,691,928 | Kelsey et al. | Oct. 19, 1954 |

FOREIGN PATENTS

| | | |
|---|---|---|
| 143,451 | Australia | Sept. 17, 1951 |
| 151,346 | Australia | May 11, 1953 |